United States Patent [19]

Wayner

[11] Patent Number: 5,557,717
[45] Date of Patent: Sep. 17, 1996

[54] METHOD AND DEVICE FOR GRAPHICAL DISPLAY OF A SPORTING CONTEST

[76] Inventor: Peter C. Wayner, 4129 Roland Ave. #1B, Baltimore, Md. 21211-2038

[21] Appl. No.: 218,734

[22] Filed: Mar. 28, 1994

[51] Int. Cl.⁶ .................................................. G06F 17/00
[52] U.S. Cl. ............................................ 395/140; 364/410
[58] Field of Search .......................... 395/140; 364/410, 364/411; 340/323 B, 323 R; 348/157; 379/88, 104; 235/375; 273/88 32 R, 176 L, 148 R; 473/58, 54; 434/249

[56] References Cited

U.S. PATENT DOCUMENTS 1,549,853  8/1925  Brewer .
4,954,981  9/1990  Dehner, Jr. et al. .................... 395/140

*Primary Examiner*—Almis R. Jankus

[57] ABSTRACT

A device for creating and displaying a graph describing the dynamic of a game. The graph is created by displaying the a curve representing the score of the game at significant moments in the process of the game. This is superimposed upon information describing these significant moments. Markers that connect these significant instances with the score are also shown. These graphical forms may be displayed in an animated production.

9 Claims, 7 Drawing Sheets

| | | | | | | | | |
|---|---|---|---|---|---|---|---|---|
| *FB 25 Watoosi* | X | KKK | BB | — | — | — | — | |
| *TB 31 Ithabasca* | X | K | | −31 | — | — | — | |
| *SB 21 Labroscopy* | X | K | BB | — | −21 | −31 | — | |
| *SS 13 Lacka* | X | KK | BBBB | −13 | −21 | −31 | — | |
| *CF 29 Dorsoloci* | X | KK | BBBB | −29 | −13 | −21 | — | |
| *RF 28 Forlicki* | XX | KKK | BB | −29 | −13 | −21 | — | |
| *LF 16 Parson* | XX | K | B | — | −16 | −29 | — | |
| *CA  6 Bootene* | XXX | KKK | B | — | −16 | −29 | — | |
| FB 15 Baskethands | | | BBBB | −15 | — | — | — | |
| TB 41 Cannihan | X | KKK | BB | −15 | — | — | — | |
| SB 11 O'Reilly | XX | KKK | B | −15 | — | — | — | |
| SS 23 Carson | XX | K | BBBB | −23 | −15 | — | — | |
| CF 19 Delilia | XX | | B | — | −19 | −23 | — | |
| RF 18 Cowisaki | XX | K | | −18 | — | −19 | — | |
| LF  5 Calhoun | XXX | KKK | B | −18 | — | −19 | — | |
| *PI 24 Tersopi* | | KK | BBBB | −24 | — | — | — | |
| *FB 25 Watoosi* | X | KKK | B | −24 | — | — | — | |
| *TB 31 Ithabasca* | XX | K | BB | −24 | — | — | — | |
| *SB 21 Labroscopy* | XX | KK | BBBB | −21 | −24 | — | — | |
| *SS 13 Lacka* | XXX | | B | −21 | −24 | — | — | |
| CA  4 Ichibod | X | KKK | BBB | — | — | — | — | |
| PI 14 Harson | XX | KKK | B | — | — | — | — | |
| FB 15 Baskethands | XX | | B | −15 | — | — | — | |
| TB 41 Cannihan | XXX | KKK | BB | −15 | — | — | — | |
| *CF 29 Dorsoloci* | X | KKK | BB | — | — | — | — | |
| *RF 28 Forlicki* | XX | KK | | — | — | — | — | |
| *LF 16 Parson* | XX | K | | −16 | — | — | — | |
| *CA  6 Bootene* | XX | KK | BBBB | −6 | −16 | — | — | |
| *PI 24 Tersopi* | XX | K | | −24 | −6 | −16 | — | |
| *FB 25 Watoosi* | XX | KK | | — | — | — | — | |
| *TB 31 Ithabasca* | XXX | KKK | B | — | — | — | — | |
| SB 11 O'Reilly | | K | BBBB | −11 | — | — | — | |
| SS 23 Carson | X | KK | BB | −11 | — | — | — | |
| CF 19 Delilia | XX | KKK | B | −11 | — | — | — | |
| RF 18 Cowisaki | XXX | KKK | BB | −11 | — | — | — | |
| *SB 21 Labroscopy* | X | K | BB | — | — | — | — | |
| *SS 13 Lacka* | XX | KK | BB | — | — | — | — | |
| *CF 29 Dorsoloci* | XXX | K | BB | — | — | — | — | |
| LF  5 Calhoun | X | KKK | B | — | — | — | — | |
| CA  4 Ichibod | X | KK | BBBB | −4 | — | — | — | |
| PI 14 Harson | XX | KKK | B | −4 | — | — | — | |
| FB 15 Baskethands | XX | KK | BBBB | −15 | −4 | — | — | |
| TB 41 Cannihan | XXX | KKK | B | −15 | −4 | — | — | |
| *RF 28 Forlicki* | | KK | | — | — | — | — | |
| *LF 16 Parson* | X | KKK | BBB | — | — | — | — | |
| *CA  6 Bootene* | XX | KKK | BBB | — | — | — | — | |
| *PI 24 Tersopi* | XXX | KKK | BB | — | — | — | — | |
| SB 11 O'Reilly | | K | BBBB | −11 | — | — | — | |
| SS 23 Carson | X | KKK | | −11 | — | — | — | |
| CF 19 Delilia | XX | KKK | BBB | −11 | — | — | — | |
| RF 18 Cowisaki | XX | K | BBBB | −18 | −11 | — | — | |
| LF  5 Calhoun | XXX | KKK | B | −18 | −11 | — | — | |

Figure 2A

| | | | | | | | |
|---|---|---|---|---|---|---|---|
| *SS 13 Lacka* | X | KKK | BB | — | — | — | — |
| *CF 29 Dorsoloci* | XX | KKK | BBB | — | — | — | — |
| *RF 28 Forlicki* | XXX | KKK | BB | — | — | — | — |
| CF 19 Delilia | | KK | BBBB | −19− | — | — | |
| RF 18 Cowisaki | X | KKK | BB | −19− | — | — | |
| LF 5 Calhoun | XX | KKK | BBB | −19− | — | — | |
| CA 4 Ichibod | XXX | | BB | −19− | — | — | |
| *LF 16 Parson* | X | K | BB | — | — | — | — |
| *CA 6 Bootene* | XX | KKK | BB | — | — | — | — |
| *PI 24 Tersopi* | XXX | KKK | B | — | — | — | — |
| PI 14 Harson | X | KKK | B | — | — | — | — |
| FB 15 Baskethands | XX | K | B | — | — | — | — |
| TB 41 Cannihan | XX | | BBBB | −41− | — | — | |
| SB 11 O'Reilly | XX | | BBBB | −11−41− | — | | |
| SS 23 Carson | XXX | KK | | −11−41− | — | | |
| *FB 25 Watoosi* | X | KKK | BBB | — | — | — | — |
| *TB 31 Ithabasca* | XX | KKK | B | — | — | — | — |
| *SB 21 Labroscopy* | XX | KK | BBBB | −21− | — | — | |
| *SS 13 Lacka* | XXX | KKK | | −21− | — | — | |
| CF 19 Delilia | X | K | | — | — | — | — |
| RF 18 Cowisaki | XX | KKK | BBB | — | — | — | — |
| LF 5 Calhoun | XXX | K | | — | — | — | — |

Figure 2B

METHOD AND DEVICE FOR GRAPHICAL DISPLAY OF A SPORTING CONTEST

FIELD OF THE INVENTION

This invention relates to the field of charts, scorecards and graphs for reporting the results of a game and more specifically to providing a record of the contest that makes it easy to visually understand the underlying dynamics of the contest.

BACKGROUND OF THE INVENTION

Sports fans often find themselves in a dilemma. There are too many games to follow and not enough time. Newspapers print box scores, statistics and game summaries. Other media like television and radio provide highlights from the game. Each of these methods provide some detail about the flow of the game, but they still omit important data.

For example, many newspapers provide box scores for baseball games that report how many times each player hit the ball per time at bat. They also provide a breakdown of which innings the runs are scored. These are useful numbers but they do not convey how crucial each hit was to the final score. They do not show which player's hit sparked a rally or which player's final strike finished off the game. Some newspapers run additional information in game summaries or news stories, but space constraints often make complete descriptions for all games prohibitively expensive.

Television newscasts are often just as limited. The small amount of time available often forces television news organizations to limit themselves to reporting the final score. When they do try to provide insight into the dynamics of the individual games, they often rely upon one or two clips of visually dramatic plays. These short glimpses often fail to capture information about the entire game.

Other sports often receive even less coverage. Statistics for basketball games and football games receive less space. Soccer, lacrosse and hockey are rarely treated to more than spot coverage. High school, college and women's teams are also rarely discussed in depth because there is less perceived demand for information about the outcome of their games.

The raw statistics provided by the newspapers are often complicated to understand. It is difficult to quickly determine whether a game was close. There is no simple way to determine if one player's actions were largely responsible for the outcome of the game. For instance, a baseball box score may report that one player hit successfully in all four chances while another ballplayer only hit once. The basic box scores do not immediately show that one particular hit by one player drove in the winning run at the end of the game.

The pages of raw statistics are also difficult to search. Some games are more closely fought than others, but the only way to find one of these games is to read all of the statistics. This makes it time consuming to study the results in the necessary detail.

The sporting world needs a more concise method of making the ebb and flow of a game apparent to people interested in the outcome after the game is finished. The method allows the fans to quickly determine how close the game was and what were the significant moments that contributed to the outcome of the game.

Another important need is for a device for collecting this information. Many small, portable computers can be modified with the addition of software to function as devices which collect the raw information about the progress of a sporting contest and then render the information as a graphical summary of the game. If such a device were to exist, many players, coaches, parents and fans would be able to collect detailed descriptions of the game on the site. They could generate a graphical summary either during the game or afterwards and study the effects of various significant moments on the outcome.

The portable device could also serve remote fans by transmitting an image of the graphical summary to a remote location through either wired or wireless communications. This may be done through any combination of telephony, electronic mail, telecopying machines and other communications technologies. These people at a distance could easily look at this image in either electronic or printed form and learn the outcome of the game.

Some fans may want to duplicate some of the tension and suspense of the game without spending the time to travel to the contest or watch it in its entirety on television. The graphical summary can be animated so that different parts of the graphical summary are drawn in sequence. If the parts of the summary are drawn in a chronological sequence based upon when they happened in the contest, then fans can simulate some of the dynamic tension of the game in the relatively short amount of time it takes to animate the graphical summary.

Such an invention would serve the interests of players, coaches, parent, fans and sports historians. A device like this that could provide the information in readily accessible, graphical form would allow people to study the outcome of the games and quickly determine the most important and salient facts about the play.

OBJECTS

It is the object of this invention to provide a device and method of displaying the score of the game at significant moments in the time of the game so that fans, players, coaches and other interested parties may quickly assimilate information about the game.

The invention will also provide a historical record of a contest in a compact and easily accessible form.

DESCRIPTION OF PRIOR ART

Several patents describe methods of presenting sporting contest information. Some of most pertinent examples include:

| | | | |
|---|---|---|---|
| U.S. Pat. No. | 844,807 | Keefe (2/1907) | 283/49 |
| U.S. Pat. No. | 921,863 | Meaney (5/1909) | 283/49 |
| U.S. Pat. No. | 1,090,346 | Riley (3/1914) | 283/49 |
| U.S. Pat. No. | 1,011,122 | Dealey (12/1911) | 283/49 |
| U.S. Pat. No. | 1,181,750 | Edwards (1916) | 283/49 |
| U.S. Pat. No. | 1,321,940 | Oscanyan (11/1919) | |
| U.S. Pat. No. | 1,549,853 | Brewer (8/1925) | 283/49 |
| U.S. Pat. No. | 1,680,609 | Grundy (8/1928) | 283/49 |
| U.S. Pat. No. | 1,838,398 | Heidbrink (12/1931) | |
| U.S. Pat. No. | 2,850,282 | O'Connor (11/1954) | 283/49 |
| U.S. Pat. No. | 3,755,939 | Denega (12/1931) | 40/70 R |
| U.S. Pat. No. | 4,890,229 | Rudnick (12/1989) | 364/410 |
| U.S. Pat. No. | 4,977,503 | Rudnick (12/1990) | 364/410 |
| U.S. Pat. No. | 5,118,105 | Brim (6/92) | 273/54 C |
| U.S. Pat. No. | 5,127,044 | Bonito (6/1992) | 379/88 |
| U.S. Pat. No. | 5,153,826 | Johnson (10/92) | 364/410 |
| U.S. Pat. No. | 5,178,544 | Aleck (1/1993) | 434/262 |

| U.S. Pat. No. | 5,241,379 | Tsujita (9/1993) | 358/93 |
| U.S. Pat. No. | 5,283,733 | Colley (2/1994) | 364/411 |

There are many books on the subject of recording the progress of a sporting contest. Some include:

Baseball: *A Comprehensive Bibliography*, compiled by Myron J. Smith Jr. and published by McFarland and Co. (Jefferson, N.C.) in 1986.

*Guide to Baseball Literature*, Anton Grobani (Ed.), published by Gale Research Co., (Detroit, Mich.)

*The World Series*, Richard M. Cohen and David S. Neft, published by St. Martin's Press, 1990.

*Complete Handbook of Sports Scoring and Record Keeping*, Jack W. Richards, published by Parker Publishing Co. (West Nyack, N.Y.) 1974.

*The World of Sports Statistics*, Arthur Friedman, published in Canada by McLelland and Stewart, Ltd, 1978.

DISCUSSION OF PRIOR ART

Many coaches and players tackled the problem of recording play in sporting contests over the years. Scoring games is a well-developed art which is described in detail in many books. *The Complete Handbook of Sports Scoring and Record Keeping* by Jack Richards and published by Parker Publishing Co. (West Nyack, N.Y.) in 1974, describes many systems for different sports. The systems, though, are oriented toward providing a play-by-play description of the events. They do not incorporate overall views that allow the reader to visually grasp the flow of the game. The systems are best used to compile statistics which provide an aggregate record of the performance.

The most common baseball system, for instance, consists of a number of icons depicting the layout of the field. The scorer reports the result of each at bat by drawing lines indicating the movement of the ball and the base runner. Numbers are written to indicate the fielders who handled the ball. A hit that is fielded by the shortstop and then thrown to the first baseman to make the hitter out is recorded as a "6-3" where the "6" indicates the shortstop and the "3" indicates the first baseman. Although this system provides an accurate record of the contest, it does not make it simple to understand the flow of the game. The reader must study each icon individually before the reader can aggregate the results to determine who is winning at a particular time.

The book, *The World of Sports Statistics* by Arthur Friedman and published in Canada by McClelland and Steward, describes another similar method for scoring a baseball game. In this method, there is no pre-drawn icon supplied for each time a batter steps up to home plate. The scorer makes their own marks in a box. This method is more confusing and it cannot be understood by a reader who is not schooled in meanings of the various symbols. It also makes it difficult for the reader to recognize the essential flow of the game and determine which team is leading at a particular time.

The systems described in the books are often closely related to patented methods for keeping score. For instance, U.S. Pat. Nos. 844,807 (Keefe), 1,011,122 (Dealey) 1,090,346 (Riley), 1,680,609 (Grundy) and 2,850,282 (O'Connor) all show similar systems for scoring baseball games. In these, the game is recorded in a set of boxes where each box holds a record of each time a batter steps up to the plate. Various forms of iconography are used to record the results.

Each of the systems fail to provide a simple graphical form that emphasizes the main point of the game: scoring runs.

Some newspapers and books devote more space to annotated box scores for baseball games. A good example of this format is found in the book, *The World Series* by Richard M. Cohen and David S. Neft and published by St. Martin's Press (New York City, N.Y.). Each game of each World Series is presented as an annotated box score with a short sentence describing what happened to each batter. For instance, in the first inning of the first game of the 1986 World Series, the book reports that "Boggs bounced to third" indicating that Wade Boggs hit the ball toward third base where it bounced before the third baseman fielded the ball and threw it to first base putting Boggs out. The reader must still examine the entire record carefully to determine whether the game was close, who was responsible for major plays and which team dominated the contest.

U.S. Pat. No. 1,549,853 (Brewer) describes the closest known prior art to the method in this patent. The patent describes a graphical method for displaying the wins and losses of each team in a season. The method is best suited for displaying won or lost records of teams. Although the score of individual contests can be displayed in textual annotations, the graphs only record the won or lost record of each team. The system is not a good method for quickly conveying the details of a particular contest.

In some years, the New York Times included detailed, graphical play by play coverage of major football games like the Superbowl. The charts graphed the movement of the ball on the field on one axis and the time of the game on the other axis. This method reports the individual plays in good detail, but it does not give good coverage to the most important detail, the score. The method in this patent emphasizes the score.

There is a need for a concise record of sports contests that report the results in form that is easy to evaluate. Sports fans should be able to use this system to understand the flow of the game and determine how closely fought it was. They should also be able to understand how the actions of a player or a group of players affected the outcome of the contest. This concise record will help fans, players and coaches remember past contests and prepare for future ones.

There are many devices used in the sporting world for reporting scores. The most common device is the scoreboard which in early years consisted of a collection of signs with numbers that were posted to remind the viewers of the current score. In later years, electronic technology allows more sophisticated displays which are often used to show replays to those in attendance.

Oscanyan (U.S. Pat. No. 1,321,940) shows a mechanical device for reporting the play of a baseball game to a remote audience. The device includes a figure of the baseball diamond. The plays of the game are simulated in graphical form by moving small signs symbolizing the players. This system relies upon numerical means to summarize the game and does not provide a graphical way for fans to quickly determine the most important moments of the contest.

A smaller, handheld system was proposed by Denega and Freska (U.S. Pat. No. 3,755,939). Their system also used a figure shaped like the baseball diamond as a background. Sliding tab strips and turning disks are manipulated to illustrate the flow of a baseball game. The system is not intended to be used to keep a history of the game or show how certain events affected the final score.

Statistics of past contests can be retrieved by a pocket sized device of Rudnick (U.S. Pat. No. 4,890,229) and Rudnick, Roldalagi, and Neff (U.S. Pat. No. 4,977,503). These devices contain past records that can be recalled by inputting a player's name or team into a keypad. The statistics are numerical and they are limited to records of individual achievement—not summaries of games.

Other sports have not been left untouched by newer technology. Brim, Gautraud, Mowers, and Dudzinski (U.S. Pat. No. 5,118,105) present a comprehensive system for bowlers who wish to study their form. The device includes a number of different sensors for gathering statistics like the velocity of the ball. The system is coupled with a digital processor that also reports the score in a traditional box format. The graphical displays, however, only report the trajectories of the ball. They are not used to show the score or provide information about the closeness of the contest itself.

Tsujita (U.S. Pat. No. 5,241,379) also describes a device for automatically collecting statistics about the score of a bowling game. The device uses the traditional scoring display method that requires the user to read numbers in order to analyze the flow of a game.

The game of golf is studied in several patents. Colley (U.S. Pat. No. 5,283,733) describes a system for connecting the 18 holes of a golf course with display terminals for reporting the scores of all the players on the course. Each player would also carry a small device that would report a swing to the system allowing it to keep track of the score.

Bonito, and Appelton (U.S. Pat. No. 5,127,044) describe a golf scoring system that includes graphical information about the course. These graphical displays include information like where the grass is rough. The score of the game, however, is shown in a traditional numerical format.

A more general device for many different sports is proposed by Johnson (U.S. Pat. No. 5,153,826). The handheld device records information about the shots made by a player during a sporting contest and produces a summary at any point during a contest. The statistics about the game are reported in numerical form, however, and the invention does not attempt to make the information more readily accessible by rendering it in graphical form.

BRIEF DESCRIPTION OF THE DRAWINGS

The invention will now be described in detail, by way of example only, with reference to the accompanying drawings, in which:

FIG. 2 shows a graph displaying the flow of a hypothetical baseball game where the vertical axis shows the player at bat and the horizontal axis shows the score after the corresponding player's actions;

Figure 1:
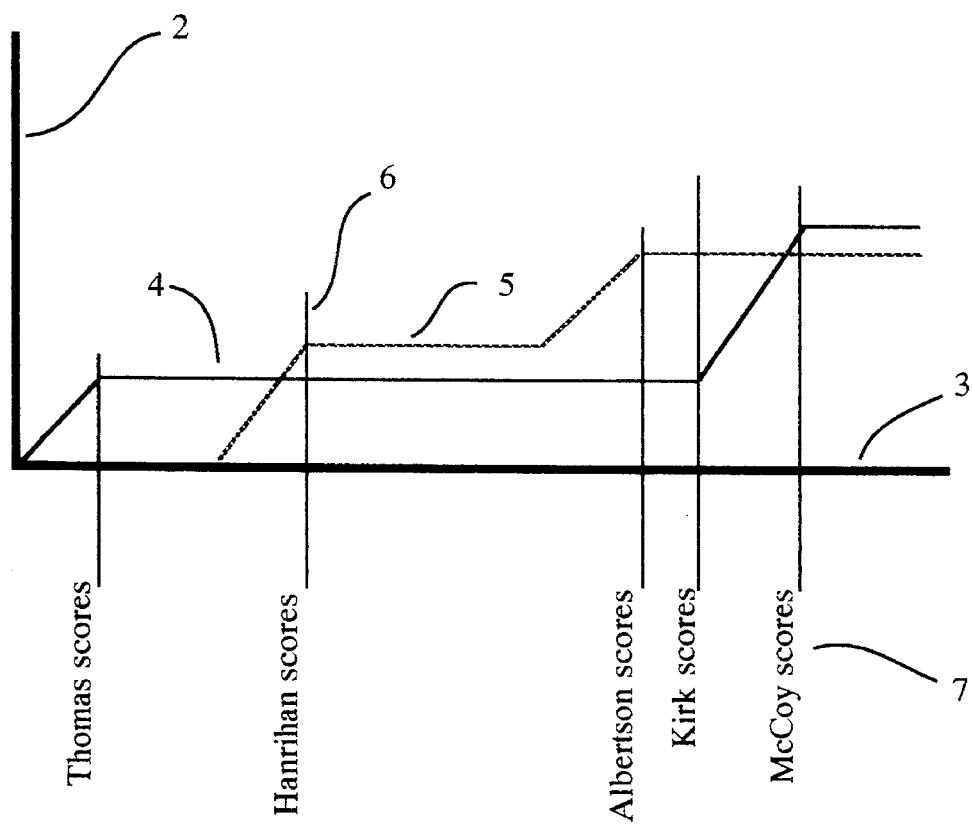
FIG. 1 shows a graph displaying the scores of the two teams and markers that indicate significant plays in the game.

REFERENCE NUMERALS IN DRAWINGS 2 axis measuring score
3 axis measuring game progress
4 line describing one side's score
5 line describing other side's score
6 mark indicating significant moment
7 informational text
8 mark indicating significant set of moments
9 line describing score difference
10 line describing visiting team's score
11 line describing home team's score
12 position of player
13 jersey number of player
14 player's name
15 representation of the number of outs
16 representation of the number of strikes and balls counted against the player
17 representation of player's on base
22 mark indicating end of visiting team's half inning at bat
23 mark indicating end of home team's half inning at bat
31 numeral indicating visiting team's score at the end of the half inning
32 numeral indicating home team's score at the end of the half inning
50 position for jersey number representing player on first base
51 position for jersey number representing player on second base
52 position for jersey number representing player on third base
81 stylus
82 touch sensitive display
83 pin connector
84 protective housing

DETAILED DESCRIPTION OF THE INVENTION

The invention and its various embodiments may be better understood by now turning to the following detailed description. It should be understood that the scope of the invention should not be limited to the details of the preferred embodiment presented here.

FIG. 1—Graph Reporting Score and Significant Moments

FIG. 1 shows a graph describing a hypothetical contest between two teams. The vertical axis 2 measures the score of the contest and the horizontal axis 3 measures the flow of the game. The process of measuring a quantity with an axis means to match each element of one set with a position along the axis. The solid line 4 represents the score of one side of the contest at each moment in the game. The dashed line 5 represents the score of the other side. This embodiment is limited to black and white figures but other embodiments may represent the lines in any manner which distinguishes between the two lines. Some possibilities are using different colors, line weights or line pattern.

In this embodiment, the two axes 2 and 3 are perpendicular. The invention is not limited to embodiments where the axes are fixed to be at right angles. In some cases, it may be desirable to use two non-perpendicular angles to create an illusion of three-dimensionality. In still other embodiments the axes may be reversed so that the horizontal axis measures the score and the vertical axis measures the flow of the game.

In some embodiments, the process of measuring the progress of game on one axis might be done with a linear function that matched each moment with a position that represented the amount of real time that had passed as a percentage of the total amount of real time devoted to the contest. In other embodiments, the function might be based upon the percentage of game time that had elapsed by that moment. The function does not need to be linear.

In some cases, game time is based upon the significant moments which constitute the progress of the game. In baseball, for example, game time is determined by the succession of innings, each inning being three outs per team. In golf, game time is determined by the satisfactory completion of 18 holes, not by a passage of ordinary time nor by a count of strokes. In general, game time is often not related to ordinary time at all and may contain many aspects that do not obey the usual rules associated with ordinary time. For instance, some contests allow points to be replayed if there is significant dispute effectively allowing participants to go back in time. Other contests support "sudden death" time that stops time when a specific event occurs. Many support very flexible units of time. Baseball may permit any number of players to bat during an inning. Each significant moment advances the progress of the game towards conclusion and is represented with a point along the axis measuring the flow or progress of the game. These significant moments are arranged according to game time.

The significant moments in the game are shown with marks 6 and informational text 7. In other embodiments, the information about the significance of a moment may be conveyed by a mixture of symbols, text and glyphs that may be multi-colored or textured if the means of reproduction permit.

FIG. 2—Application to Baseball

FIG. 2 shows a graph describing a baseball game between two teams. The most important factor in the game, the score, is represented by two lines 10,11. The solid line 11 represents the score of the home team and the dashed line 10 represents the score of the visiting team. As more runs are scored, the lines move up along the axis of the drawing which is measuring the count of runs—in this case to the right along the horizontal axis.

In other embodiments of the invention, the axis might measure the score in a way that numerical score decreases along the axis. This may be desirable in a game like golf where the object is to finish with the lowest possible score. In this figure, the line describing the score moves along the axis in a linear fashion. Each additional run pushes the line the same distance to the right. In other embodiments, the relationship between the position of the line along the axis could be non-linear. In many cases, it might be logarithmic or exponential. For instance in the relatively new sport of pinball, the amount of points awarded for each successful action often increases exponentially with play. A logarithmic relationship is desirable in these cases.

The spatial relationship between these lines 10,11 describes the closeness of the game. A close gap 42 indicates that the two teams' score is very close while a large gap 43 shows that one team is leading by a larger margin. The quick changes in the lines also indicate significant moments in the game when runs scored. A hit that scored four runs 40 is easy to spot. Smaller, but still significant rallies 41, are also readily apparent.

In this embodiment, these significant moments are the batting attempts by each player. In other more detailed examples, the set of significant moments might include each pitch. Studies of an individual player, on the other hand, might focus on the trips of one particular player. Here, one line is devoted to each trip to the plate. Other embodiments may add special emphasis to these moments by adding colored marks, adding different glyphs or changing the way that the line is represented.

At the end of each half inning in baseball, the team at bat and the team in the field exchange their positions. These changes are marked by a dashed line 22 which delineates the end of the visiting teams trips to the plate and a solid line 23 which show the end of the home teams chances. In other embodiments, the change may be shown by colored lines or different patterns.

The score at the end of each half on an inning is displayed next to the line indicating each team's score. The visiting team's score 31 appears next to the dashed line indicating the score of the visiting team 10. The home team's score 31 appears next to the solid line indicating the home team's score 32.

Figure 3:
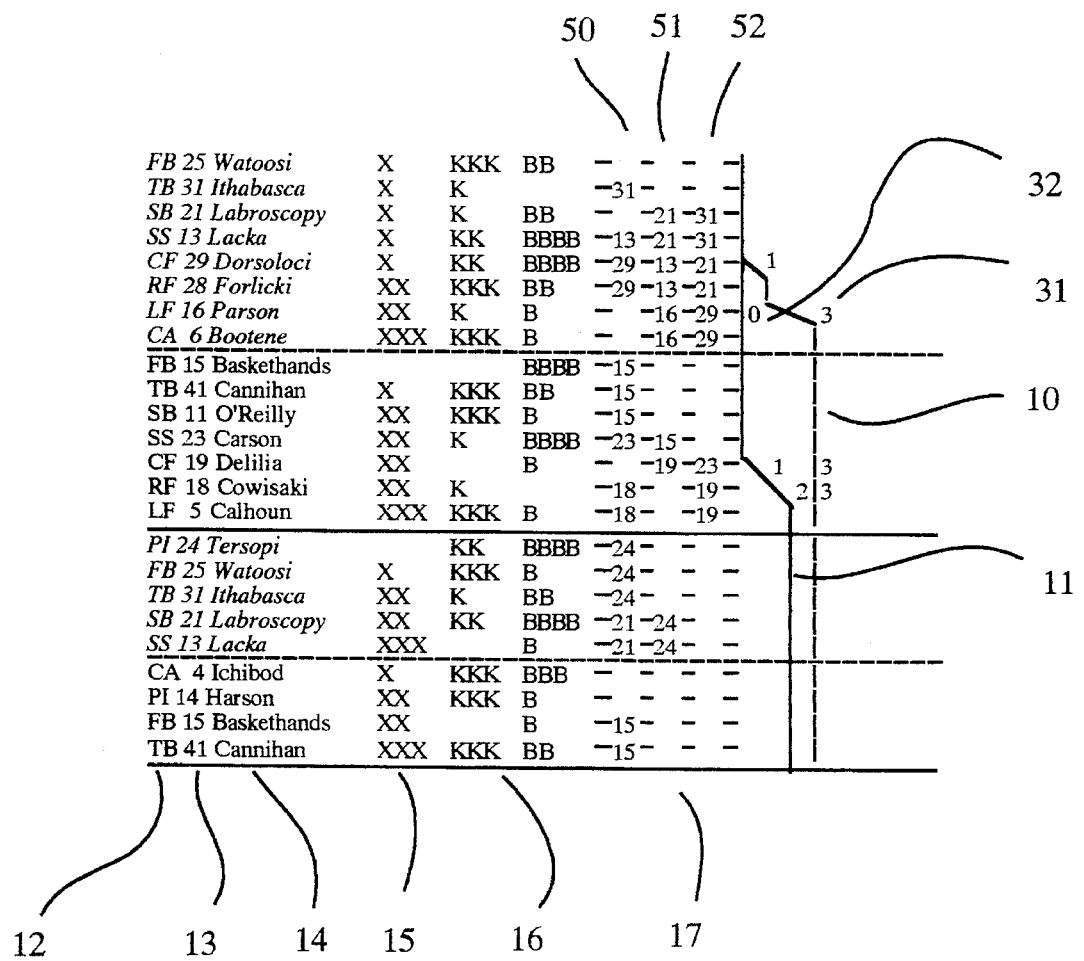
FIG. 3 shows a detail of FIG. 2 representing the partial graph reporting the first two innings of a hypothetical baseball game.

FIG. 3—Detail of FIG. 2

FIG. 3 shows a detail of FIG. 2. Some of the small details are more apparent in this figure.

Each line of text reports the after effects of one player's trip to the plate. The name of this players 14, their jersey numbers 13 and their position 12 are indicated at the far left portion of the line. Other embodiments may report only a subset of this data to save space. Still others may add additional personal information about the batter including the batter's batting average, the batter's preferred batting position or the batter's home town. The rest of the line contains three boxes which report statistics important to the flow of the game.

The first box 15 represents the number of outs completed against the team at bat after the player at the plate each finished attempts to hit successfully. In this case, the number of X characters represents the number of outs. It is also possible to indicate this value with numbers or other glyphs in other embodiments.

The second box 16 shows the number of final "count" when the player's turn finished. The count is the number of pitches classified as strikes or balls. In this case, the strikes are represented with 'K's and the balls are represented with 'B's. In other embodiments, the count may be represented by different colored numbers, glyphs or marks.

The third box 17 shows the positions of players from the team at bat who have successfully reached first, second or third base. In this embodiment, there are three blanks in the box which are filled with the jersey number of the player who is at one of these bases. The first position 50 holds, the jersey number of the player on first base. The second position 51 holds the jersey number of the player on second base and the third position 52 holds the jersey number of the player on third base. In other embodiments, the player's positions may be marked in a diamond shaped configuration that more closely resembles the positions of the bases. In still other embodiments, the positions may be marked using different colored glyphs or marks in any configuration that may be consistent with the rules of play of the game.

Figure 4:
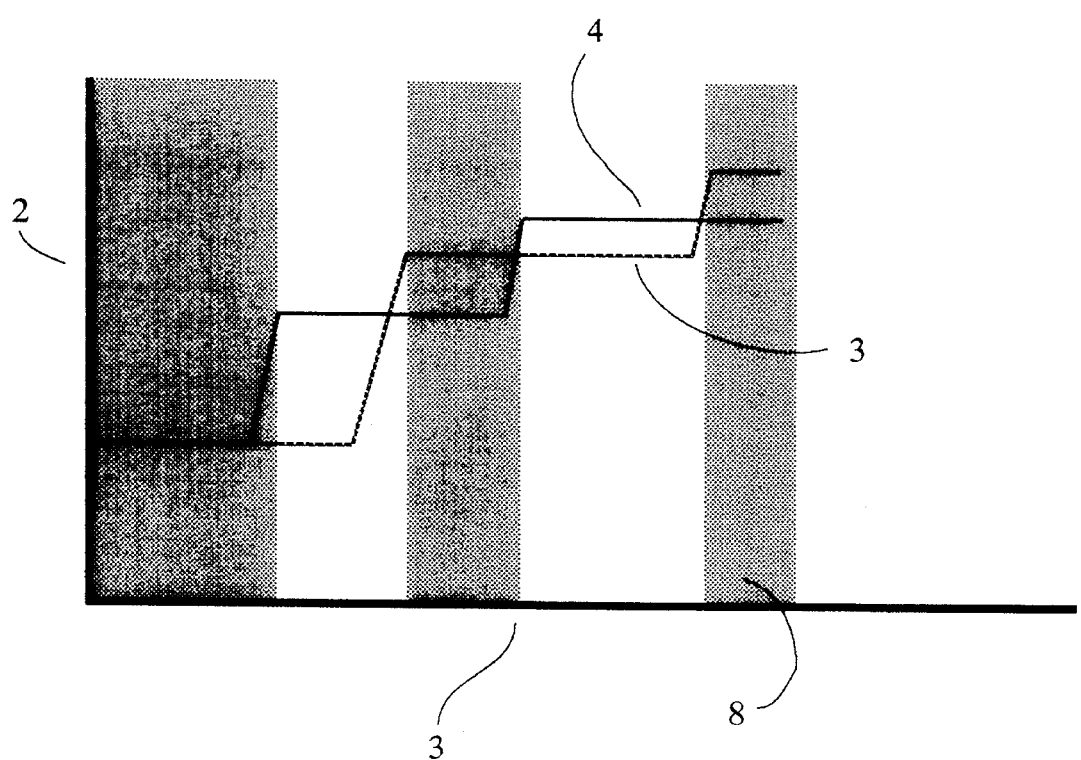
FIG. 4 is another graph showing a hypothetical American Football contest where the vertical bands signify possession of the ball by one team and the unshaded vertical bands signify possession of the ball by the other team.

FIG. 4—Graph with Significant Segments of the Game

FIG. 4 shows a graph designed to indicate particular moments in the game when the significant moments are not instantaneous. In American Football, it might be useful to represent the time when one team controlled the ball. In this case, the dotted background 8 represents control by one side.

In other embodiments, several different graphical forms may be used to indicate regions of interest for different reasons. One might represent play by one player and the other might represent play by another player. Any graphical means that distinguishes between the regions may be used in other embodiments. Patterns composed of specially designed glyphs, line structures or drawings may be used.

The distinction can also be created by using different colors or physical textures if the means of reproduction allow them.

The vertical axis 2 measures the score and the horizontal axis 3 measures the flow of the game. The dashed line 5 represents the score of one side and the solid line 6 represents the score of the other side.

Figure 5:
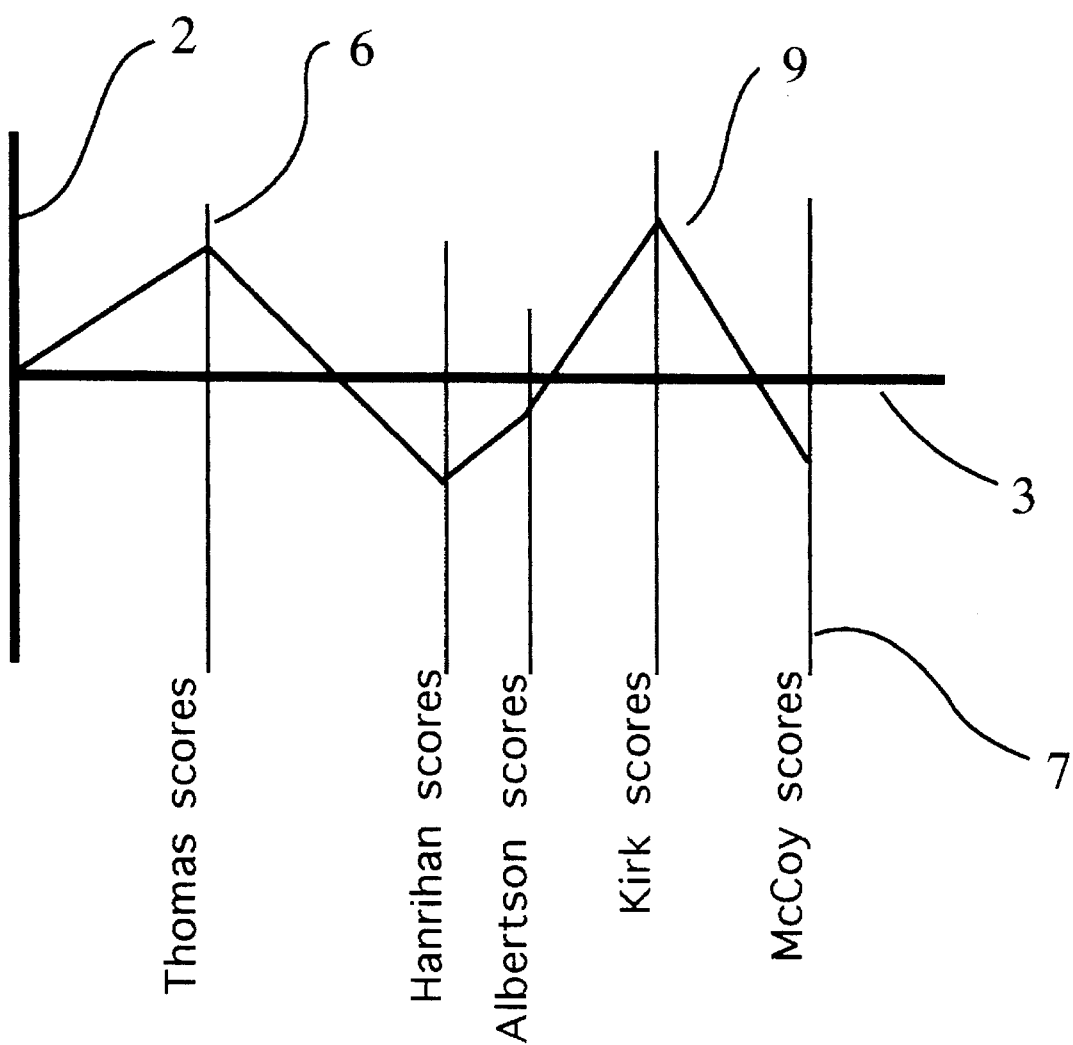
FIG. 5 shows a graph displaying the relative difference between the scores of two sides in a contest with markers to indicate the significant moments in the game.

FIG. 5—Relative Score Graph

FIG. 5 shows a graph that describes the relative difference between the score of different sides. The vertical axis 2 measures this difference and the horizontal axis 3 measures the progress of the game. A gray line 9 represents the difference between the two scores. If one side has a higher score, then the line representing the difference 8 will appear above the horizontal axis 3 and if the other side is in the lead, then the line 8 will appear below the horizontal axis 3. The amount the line 8 moves above or below the axis 3 is proportional to the size of the difference. A large distance indicates a large lead.

The significant moments in the game are indicated by a sequence of marks 6 and information 7 that may appear in either graphical, textual or symbolic form. These also may be multicolored or textured.

Figure 6:
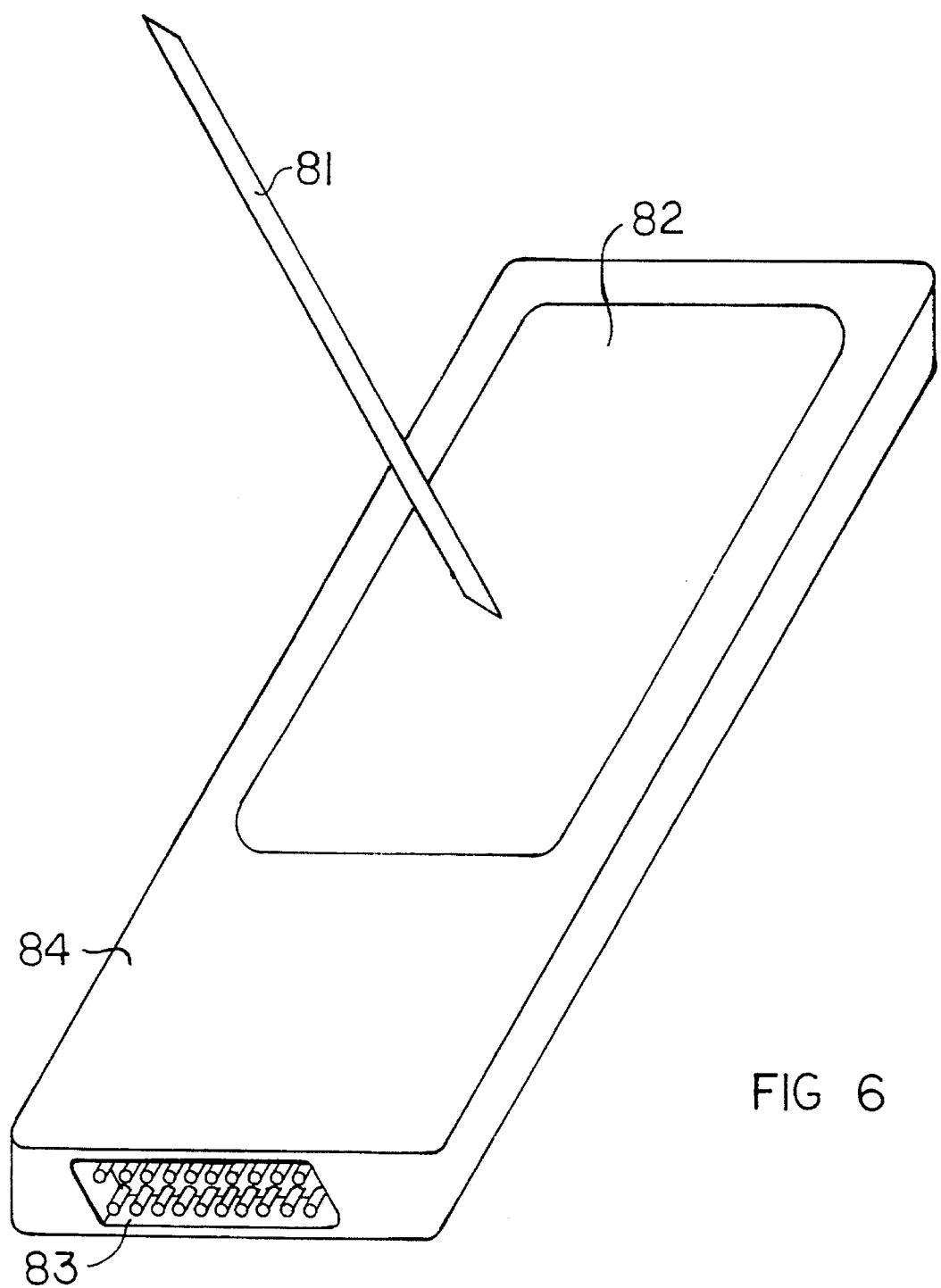
FIG. 6 shows a device for accepting input and displaying graphical descriptions.

FIG. 6—Device For Generating Graphical Summaries of Sporting Contest

FIG. 6 shows the preferred embodiment for the device. A touch sensitive screen 82 will both accept information about the flow and progress of the sporting contest and display a graphical description of the contest like the ones shown in FIGS. 1, 2, 3, 4 and 5.

A stylus 81 will be used to activate the screen. The stylus allows the system to determine the location touched with greater precision. In some embodiments, the stylus can be avoided by requiring the user to touch the screen with a finger. This may be desirable in locations where a large screen is feasible and a stylus could easily be misplaced. The finger is not a good option if the device must be manufactured to fit in a pocket.

In other embodiments, a keyboard input device may be used to accept the information about the flow of the game. In other cases, a microphone could be coupled with voice-recognition software to allow the fan to input information by speaking. There are many other forms of input available and the invention should not be limited to the forms mentioned here.

In one embodiment, the graphical form describing the contest will appear on the screen 82. In many situations, a user may want to transmit the description of the game to a remote location. This allows people who did not attend the contest to study the flow of the game and understand the significant moments. In other cases, someone may wish to create a more permanent record by printing out a copy of the graph. In still other cases, the user may wish to display the result with another medium like a projector or a holographic device. The connector 83 can be used to transmit the data describing the contest to the other output device.

The protective housing 84 shields the electronics in the device. It provides protection against electro-magnetic interference, dust, dirt, water, physical and electrical shock as well as other routine adverse environmental effects.

OPERATION

The device shown in FIG. 6 is simple to operate. The user interacts with the information displayed upon the screen to input information about the flow of the sports contest. The screen will provide a number of different choices and the user will select among them with the stylus. The choices would reflect the nature of the game. The electronic computer in the device would accept the information, analyze it, store it and convert it into a graphical form using the methods like those described in FIGS. 1, 2, 3, 4 and 5. If the user requested it, the information could be displayed on a remote display or printed.

The user would begin by inputting information about the number of sides or opponents in the contest. The user could also input information about each player on each side that might include data each player that could be included in each graphical chart. This information could assist the user understand the flow and progress of the game if the information is included in the final chart or graphical form. This information might include facts about the personal history of each player including their name, their place of birth, their age, their astrological sign (e.g. Libra, Leo etc.), their marital status or other data that might help the user understand more of the personal aspect of the contest. The information could also include data about the player's status on the team including their jersey number, the position that the player plays for the team and any statistics about the player's past contribution to the team's success. This information would often be specified at the beginning of each contest, but it may be edited or changed during the progress.

During the game, the user would interact with the electronic computer to specify the status of each side as the game progressed from start to finish. This would include information about the score, the contributions of some of the players and any information about the play that might be successfully included in the final chart.

The process of inputting information at different points in the progress of the game is the process of selecting significant moments. The user might input information about many significant moments in the game and display all of them in a final graphical form. Or the user might choose to construct a graphical form that only included a subset of the significant moments in the game.

In the case of baseball, the user might input the success or failure of each player's trip to the plate. This could include the final number of balls or strikes counted against the player during their time at bat. It could also include information about each pitch and the player's reaction to it. The user could also input the player's contribution to the progress of the game by recording whether the player's efforts earned a position on base or ended up making an out.

The significant moments in the game of baseball might include each pitch thrown. Or the significant moments might be limited to the end of each player's trip to the plate. The user would choose the appropriate level of detail.

The software that controlled the behavior of this electronic computer would be customized for each game that the device might be used. It would include standard forms for creating a complete description of each contest, The user would interact with the software using the input device so that the computer could assemble a description of the score of the contest at these significant moments.

The electronic computer would be responsible for accepting the information about the significant moments in the contest and assembling it into a graphical form that could be displayed at any time during or after the contest. The form might be displayed on the device itself or it could be transmitted to a distant printer or other display.

The method of representing the dynamics of a sporting contest can be used to inform interested people in a number of different ways. In the preferred embodiment for static media shown in FIG. 1, FIG. 2, FIG. 3, FIG. 4 and FIG. 5 complete information about each significant moment in the game is presented in black and white along one axis of the graph. This is ideal for presenting a description of the game in a newspaper or other printed forum. A publisher would gather the information about the contest and then convert it into a representation of the contest using this method.

Computers and digital systems can simplify this process dramatically.

The method can also be used in media like television where visual information is transmitted. The viewer can quickly determine if the contest was close or whether one side dominated the score. If the medium allows dynamic or moving pictures, then the graphs may be presented dynamically where significant parts of the game are highlighted in turn.

In the preferred embodiment for dynamic media like television, the drawing of the graph may be animated so that the viewer may experience the flow of the game in a compressed amount of time. The drawing process would begin at the start of the contest and the animation would display the lines describing the score being extended until the complete description of the game was visible. The viewer would not know the final score until the animated sequence finished. The viewer could have experience the suspense in a much shorter time than it would take to watch the game in real time.

Many presentation techniques may evolve in such an animated system. If television footage of the contest is available, then the animation of the graph may be suspended at significant moments so that the play may be illustrated with real footage. Or a commentator might offer oral description of the events at that particular moment.

In the future, multi-media computer systems linked by nationwide networks may provide this information to the public in a variety of different ways. The networks could provide summaries of all past games or it may provide statistical summaries of the games.

SUMMARY, RAMIFICATIONS AND SCOPE

These charts and graphical forms are naturally suited to being distributed in books or pamphlets that summarize all of the games of a particular season. Large sporting establishments like Major League Baseball and Major League Football and smaller organizations sponsoring sporting activities like school districts may want to preserve a record of their contests in archival form.

The forms may also be reproduced by a variety of different electronic means. Television news reports of sporting contests could use the forms as a more complete replacement for the short clips of exciting plays. The summaries could also be created by electronic devices like computers that access complete game descriptions stored in data bases.

Most of the discussion presented here presents a detailed description of how the invention may be used to report scores for the popular game of Baseball and American Football. Nothing in these descriptions should be considered as limiting the scope of this invention to these sports. Nor should anything outside of the claims be construed to limit the scope of the invention to the particular graphical forms presented in the discussion.

I hereby claim:

1. A method intended for displaying the progress and results of a sporting contest, said method comprising the steps of:

establishing a coordinate reference frame upon a register in which one axis measures the score of the sporting contest and the other axis measures the progress of the sporting contest, said progress comprising increments of game time;

selecting a set of significant moments comprising a game time dependent series each representing an advance towards conclusion of the sporting contest along said axis measuring said progress of the sporting event in said coordinate reference frame;

recording upon said register a plurality of points in said coordinate reference frame, at least one line connecting two said points in said coordinate reference frame corresponding to the score at each said significant moments in the sporting contest;

graphically representing upon said register each said line corresponding to the score and glyphs proximate to said reference frame indicating a particularity of said advance toward conclusion made by each said significant moment;

graphically representing information indicating significant moments in the game including information from a group consisting of the player's jersey number, the player's personal history, the player's position, the player's name, the player's contribution to the score, the player's contribution to the game's progress, the player's astronomical sign, the player's opinion and the player's physical characteristics thereby generating a graphical summary of the progress and results of a sporting contest in the register.

2. The method of claim 1 in which the marks indicating the significant moments in the game include information about a game of American Baseball selected from a group consisting of the score, the position of each player on a base, the results of each player's trip to a plate, the result of each pitch, the type of each pitch, the number of balls, the number of strikes, and the number of outs.

3. The method of claim 1 in which said marks indicate significant moments in a game of American Football selected from a group including the moments when the teams exchanged possession of the ball, the name of any player scoring points, the position of the ball at each down, the weather conditions, and the play attempted on each down.

4. The method of claim 1 in which said marks indicate significant moments in a game of Lacrosse.

5. The method of claim 1 in which said marks indicate significant moments in a game of Basketball.

6. The method of claim 1 in which the presentation of the form is animated.

7. A device operating in accordance with the method of claim 1 said device comprising:

a control unit including memory for holding data and a processor in communication with a display device and an input device;

said input device comprising means for inputting significant moment information about a sporting contest;

means coupled with said input device effecting storage of said information in said memory;

means coupled with said memory means enabling generation of a graphical representation of said significant moment information of the sporting contest stored in said memory on said display device whereby said data stored in said memory inputted with said input device may be converted by said processor into a graphical display in summary of said progress and results of said sporting contest upon said display device.

8. The device of claim 7 in which the display device is a printer.

9. The device of claim 7 in which the display device is located at a remote location further including means of transmitting information to this display device.

* * * * *